United States Patent [19]

Yamamoto

[11] Patent Number: 5,173,353
[45] Date of Patent: Dec. 22, 1992

[54] AIR VENTING BELT FOR RETREADING TIRES

[75] Inventor: Kouzou Yamamoto, Nishinomiya, Japan

[73] Assignee: Sumitomo Rubber Industries, Ltd., Kobe, Japan

[21] Appl. No.: 620,009

[22] Filed: Nov. 30, 1990

[30] Foreign Application Priority Data

Dec. 6, 1989 [JP] Japan .............................. 1-141498[U]

[51] Int. Cl.⁵ ............................................. B32B 23/02
[52] U.S. Cl. .................................... 428/192; 428/193; 428/250; 428/265; 428/286; 156/87; 156/96
[58] Field of Search ............... 428/192, 193, 250, 265, 428/286; 156/87, 96, 121, 123

[56] References Cited

U.S. PATENT DOCUMENTS

| | | | |
|---|---|---|---|
| 3,743,564 | 12/1973 | Gross | 156/394 |
| 3,836,028 | 5/1975 | Hindin et al. | 156/394 |
| 4,328,053 | 5/1982 | Medlin, Jr. | 156/96 |
| 4,761,324 | 8/1988 | Rautenberg et al. | 428/198 |

FOREIGN PATENT DOCUMENTS 1520288  8/1978  United Kingdom .................. 156/96

Primary Examiner—Patrick J. Ryan
Assistant Examiner—Elizabeth Evans

[57] ABSTRACT

An air venting belt for use between an outer surface of a tire and an inner surface of an envelope when a retread tire is vulcanised, comprising a base cloth made of woven cloth which is expansible at least in the longitudinal direction of the belt.

11 Claims, 6 Drawing Sheets

AIR VENTING BELT FOR RETREADING TIRES

BACKGROUND OF THE INVENTION

The present invention relates to an air venting belt used in curing a retread tire by the precured retreading method in which a worn-out tread is removed from a used tire by bufffing, a sheet-like unvulcanised cushion rubber is applied thereon, a belt-like precured tread is applied thereon, and the cushion rubber is vulcanised, thereby integrating the buffed tire and the precured tread.

Heretofore, an air venting belt has been used in the method which comprises a heat resistant and non-expansible nylon cloth.

In general such a process for retreading a tire, as shown in FIG. 12 is as follows. A belt-like precured tread b is applied over the crown of a buffed tire c (the tire to be retreaded from which the worn-out tread has been buffed) which has been covered with a non-vulcanised sheet-like cushion rubber d. Thereafter, the assembly is covered with an envelope e (a rubber cover) which protects the outer surface of the tire from direct contact with the curing steam. The overall appearance of the envelope e is like a doughnut having a "U"-shaped cross section open inwardly. At this time, strips of air venting belt a made of nylon cloth are laid between the tread and the rubber cover at prescribed intervals in the circumferential direction. Thus prepared tires g are then loaded with others into a vulcanising vessel with seal plates f laid between the tires and heated steam, pressure of which is several kg/cm² is supplied to both the tread and sidewall zones as shown by arrows P. At this time, since the above-mentioned belts a are laid between the tread b and the envelope e, air between the tire and the envelope vents through the mesh or open weave of the cloths as shown by arrows A.

However, as mentioned above, since a non-expansible belt a is used in the conventional method, the tire grooves h are unusually deformed, as shown in FIG. 13. That is to say, the non-expansible belt a prevents the envelope from stretching and fitting itself to the inner surface of the tire grooves h. Therefore, the force shown by arrows F operates on the end faces of the tread b, and a stress concentration happens in a narrow or thin portion i located at the bottom of the tire grooves h, and deformation happens. For example the width of the groove becomes extremely narrowed (see the tire groove h in the upper side of FIG. 13), or even the groove takes a "W"-shaped bottom face because of the association to a bend of the cushion rubber (see the tire grooves h in the lower side of the FIG. 13). As mentioned above, the conventional air venting belt thus causes a bad appearance for the tire grooves h and reduces the value and quality of the tire.

Further, since several tires g are loaded for vulcanisation, pressed together as shown in FIG. 14, in the portion where the belt is positioned marking from the fabric may occur and cause a bad appearance.

SUMMARY OF THE INVENTION

According to the present invention, there is provided an air venting belt for use between an outer surface of a tire and an inner surface of an envelope when a retread tire is vulcanised, comprising a cloth made of woven cloth which is expansible at least in a longitudinal direction of the belt.

The expansible woven cloth preferably comprises a rubber yarn arranged in the longitudinal direction of the belt corresponding to the radial direction of the belt.

Also, it is preferable that both end areas of the belt, which in use are directly abutted to the sidewalls of the tire are laminated with smooth film on one side. This is preferably the side of the base cloth which directly contacts the sidewalls of the tire. Alternatively both sides of the ends may be covered by film. The base cloth and the smooth film are seamed together to integrate and laminate them such that the base cloth is fully adhered to or sandwiched between the smooth film or films.

Further, according to the present invention, there is provided an envelope laminated with air venting belt made of expansible woven cloth. The envelope laminated with such air venting belt cloth comprises an envelope made of rubber and air venting belts fixed integrally to the inner surface of the envelope.

Hereinafter, the use of the belt of the present invention will be explained.

When steam pressure is applied to the tread, the belts fitted around the tire assembly are deformed together with the rubber envelope and closely contact the tire tread including the sidewalls of the tire grooves, since the belt is stretchable. Thus stress concentration does not occur in the thin portion (referring to i of FIG. 13 in a conventional example) located at a bottom of the tire groove.

The expansible cloth of the belt can be produced easily by using rubber yarns in the longitudinal direction which is used in the radial direction of the tire.

Further, when smooth films are on the surface which directly contacts the sidewall of the tire impressed patterns (referring to j of FIG. 14) are not left.

Further, when smooth films are used not only for the front face but also the reverse face of the cloth and the base cloths and the smooth films are seamed together such that the base cloth is sandwiched between smooth films, the smooth films can be integrated tightly and easily with the cloth.

Further, if the expansible cloths are integrally laminated with an inner face of the envelope, there is no need to separately arrange the air venting belt or belts in the vulcanising operation for a retread tire. Therefore, the efficiency of the work will be improved.

Hereinafter, on the basis of the accompanying drawings, several embodiments of air venting belt of the present invention are explained in detail.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
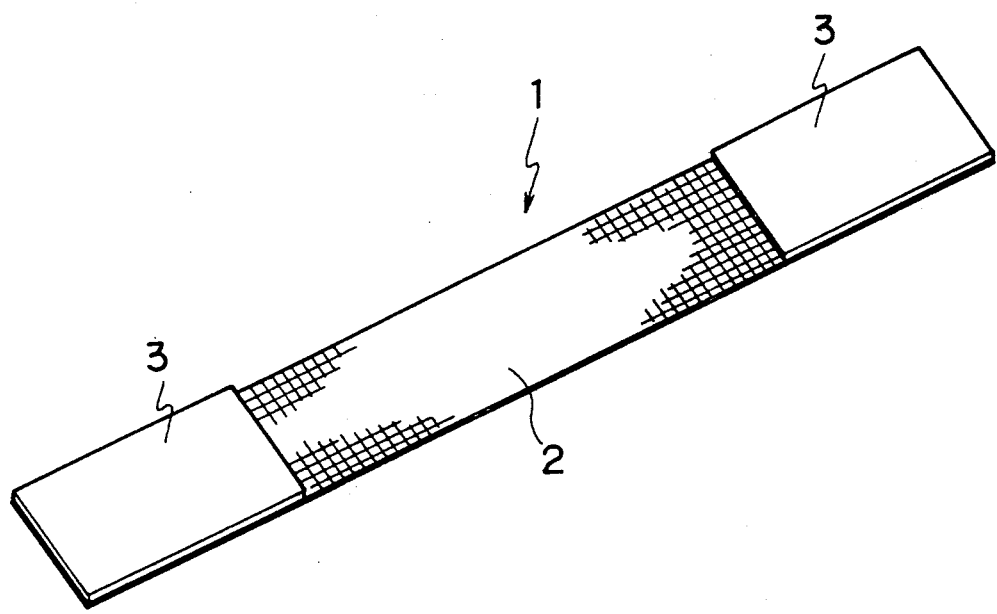
FIG. 1 is a perspective view showing one embodiment of air venting belt.
Figure 2:
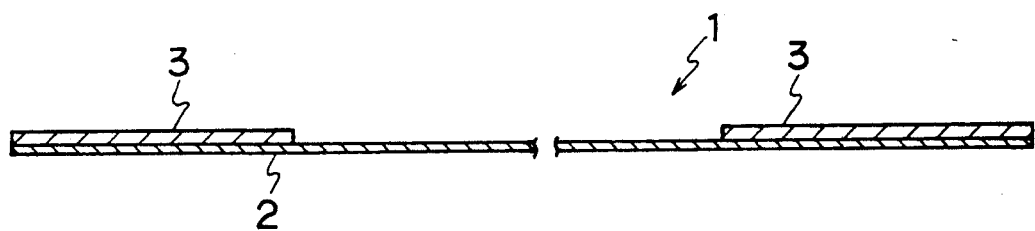
FIG. 2 is a cross section of the air venting belt of FIG. 1.

In the embodiment shown in FIGS. 1 and 2, an air venting belt 1 comprises a base cloth 2 made of a strip of expansible woven cloth and rectangular end regions 3 covered by smooth film. The film regions 3 are laminated and integrated onto both end portions of the base cloth 2. The base cloth 2 and the smooth film regions 3 are made of heat resistant materials. The smooth film regions 3 act as means for separating the base cloth 2 from a tire and for preventing the base cloth 2 from marking the tire as will be described in more detail below. For example, the base cloth 2 comprises rubber yarn (warp) in the longitudinal direction (i.e. the radial direction of a tire when the tire is covered with this belt as shown in FIG. 4 or FIG. 5) and any kind of heat resistant yarn (weft) such as cotton, synthetic resin or the like in the width direction. For the film region 3, rubber or synthetic resin material can be used. Both the base cloth 2 and the film are integrated with each other by bonding with adhesive or by seaming.

Figure 4A:
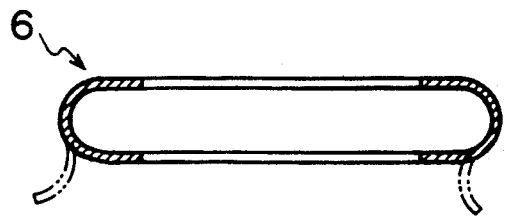
FIGS. 4a and 4b are cross sections illustrating the use of the air venting belt.
Figure 4B:
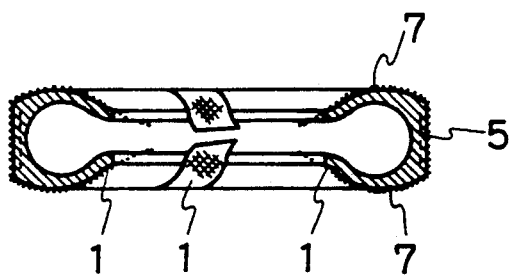
Figure 5:
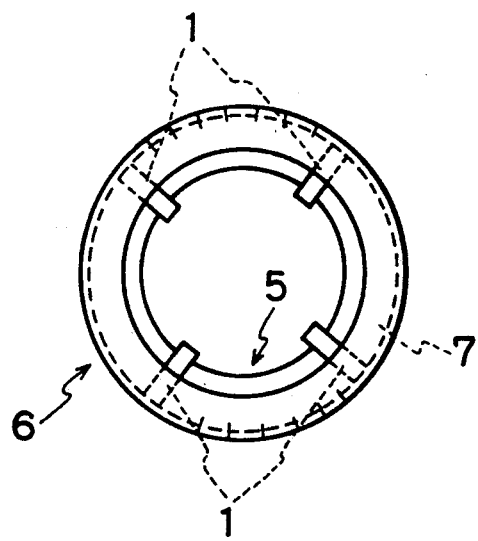
FIG. 5 is a plan view illustrating the use of the air venting belt.

When used, as clearly shown in FIGS. 4 and 5, the above-mentioned air venting belt 1 is arranged with a "U"-like-shape extending in the radial direction of the tire 5. The tire is then covered with an envelope 6 by expanding and opening one sidewalls of the envelope 6 as shown by phantom lines in FIG. 4a. Thus the smooth film regions 3 are placed at positions corresponding to the sidewall portions 7 of the tire 5 and is mounted on the tire 5.

Figure 3:
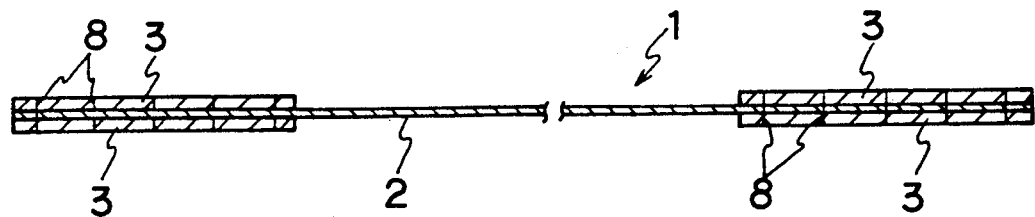
FIG. 3 is a cross section of another air venting belt.

Next, FIG. 3 shows another embodiment of the present invention. In both tire sidewall contacting portions of the base cloth 2 of the air venting belt of FIG. 3, the smooth films are not only put on the front faces but also on the reverse faces. Further, the base cloth 2 and the smooth films are seamed with each other by means of stretchable yarns such as rubber threads to integrate and laminate them such that the base cloth 2 is sandwiched between the smooth films 3.

Therefore, there is an advantage that the air venting belt can be mounted on the tire 5 as shown in FIG. 4 without the need to take special care which face is the front.

Figure 6:
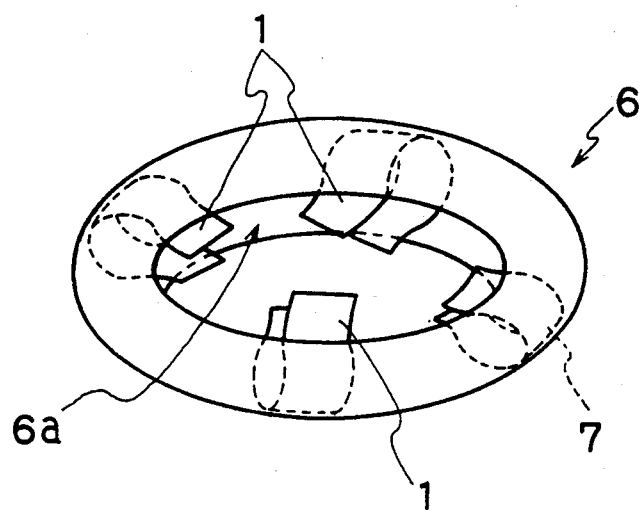
FIG. 6 is a perspective view showing an envelope with the air venting belt of the present invention.

Further, FIG. 6 shows another embodiment of an envelope laminated with an air venting belt of the present invention. The circular-shaped envelope 6 of substantially "U"-shape has an inner surface 6a. A plurality of the air venting belts 1, for example those shown in FIGS. 1, 2 or 3 and so on are integratedly fixed on the inner surface 6a of the envelope 6 so as to cross with the circumferential direction.

Figure 7:
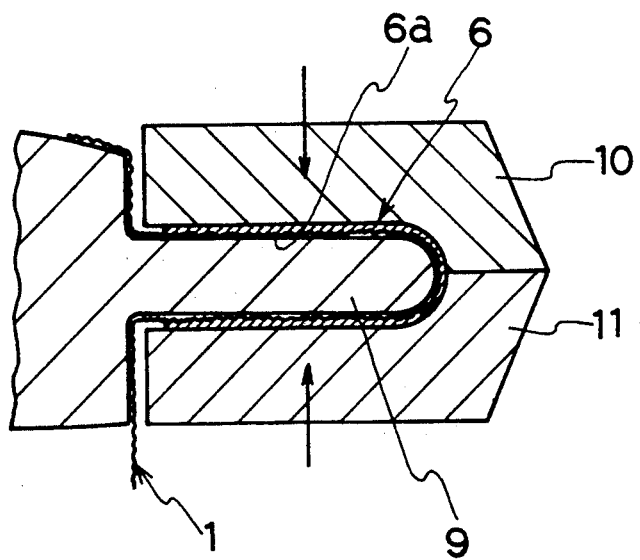
FIG. 7 is a cross section showing the process for producing the envelope of FIG. 6.

A preferable method for fitting the air venting belts into the envelope will be explained with reference to FIG. 7.

Raw rubber material is vulcanised and formed to form the envelope by means of an upper die 10, middle die 9, and a lower die 11. Then the above-mentioned belt 1 made of woven cloth is stuck on the middle die 9. Then, the upper die 10 and the lower die 11 are assembled, raw rubber material is supplied to the cavity between the middle die 9 and the upper and lower dies 10, 11. Then the material is heated and pressurised between the upper and lower dies 10, 11. Thus the air venting belt is integrated and laminated on the inner surface 6a of the envelope 6.

Figure 8:
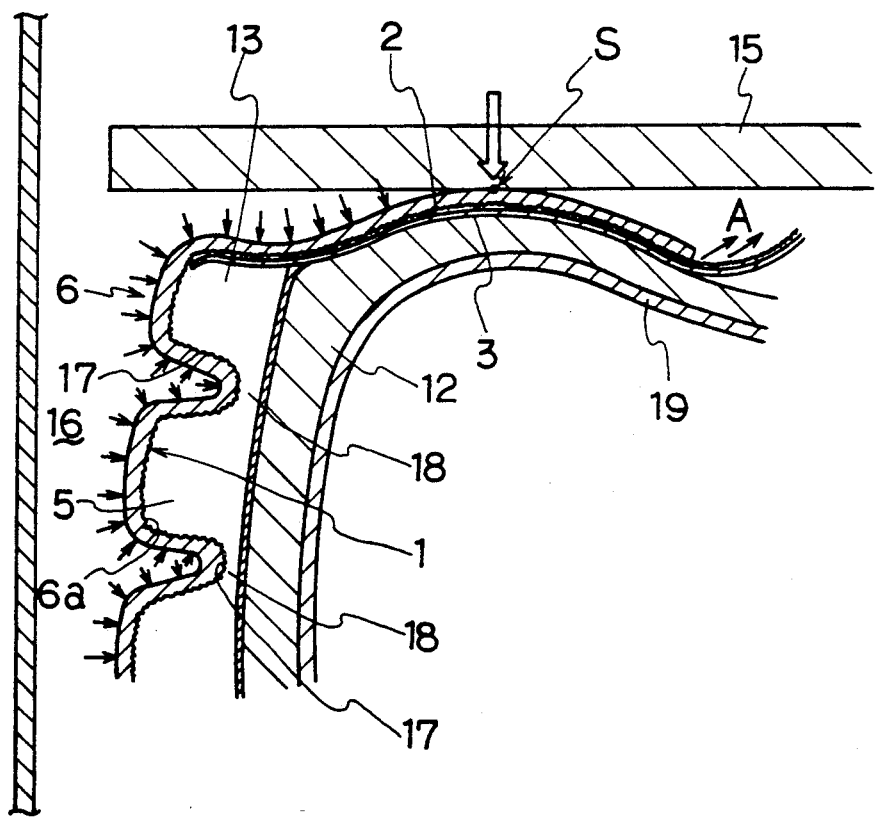
FIG. 8 is an enlarged cross sectional view showing a vulcanising step in which the air venting belt of FIG. 1 is used.
Figure 9:
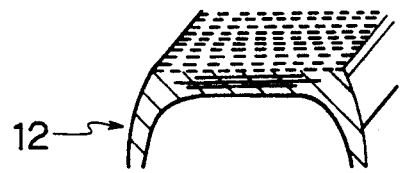
FIG. 9 is a perspective view showing an example of a tire to be retreaded.

The above-mentioned air venting belt is used in retreading a tire as shown in FIG. 8. It is laid between the outer surface of a tire 5 and the inner surface 6a of the envelope 6 when the rubber cushion 14 is vulcanised, for the purpose of venting air in the direction of arrow A between the outer surface of the tire 5 and the inner surface 6a of the envelope 6.

Preparation of a worn tire before this is briefly explained as follows.

Figure 10:
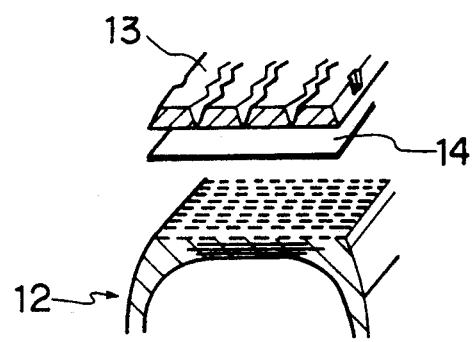
FIG. 10 is a perspective view showing components of a retread tire before the retreading process.

A used tire 12 for retreading is smoothly finished as shown in FIG. 10 by buffing to remove the worn tread, and is laminated with a precured tread having a belt-like shape and a vulcanisable cushion rubber sandwiched between the tire carcass and the belt-like tread.

The tire 5 assembled as mentioned above is then covered with the envelope 6, as shown in FIGS. 4 and 5 with the air venting belts 1 laid between them. Further a tube 19 and a flap 20 are fitted, and a rim 21 is attached, and then the tube 19 is pressurised such that the inner pressure in the tube is nearly equal to that of a running tire. Further several retread tires which are each prepared in this way are loaded together with seal plates 15 laid between the tires into a vulcanising chamber. The space 16 located outside the tire is filled with steam having a temperature of 105° to 160° C. and at a pressure P of 4 to 6 kg/cm$^2$. The envelope 6 protects the outer surface of the tire from direct contact by steam.

The above-mentioned vulcanisable sheet-like cushion rubber 14 (see FIG. 10) is vulcanised, and then the precured tread 13 is integrated tightly to the tire casing 12. During this operation, as shown in FIG. 8, the belt 1 and the envelope 6 are elastically deformed and lie along the inner surfaces of the tire grooves 17 due to the steam pressure P, since the air venting belt is expansible.

Therefore, the above-mentioned pressure P is applied to the surfaces of the tire grooves 17, and stress concentration does not occur in the thin portion 18 located in the bottom of the tire groove 17. Therefore, the tread 13 can retain the normal shape thereof, and, of course, the normal shape of the tire grooves can be kept, and the vulcanisation successfully finished.

Figure 11:
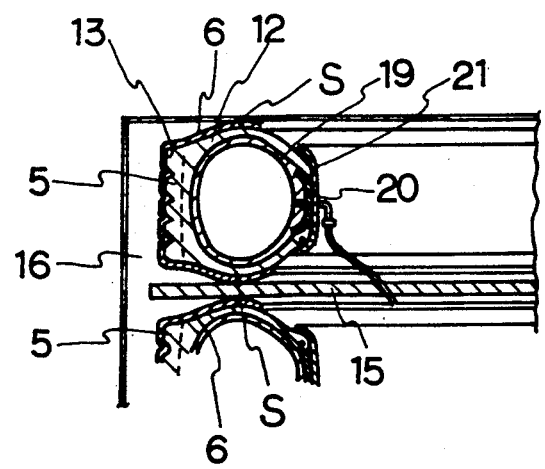
FIG. 11 is an enlarged cross sectional view illustrating an example of a vulcanising step.
Figure 12:
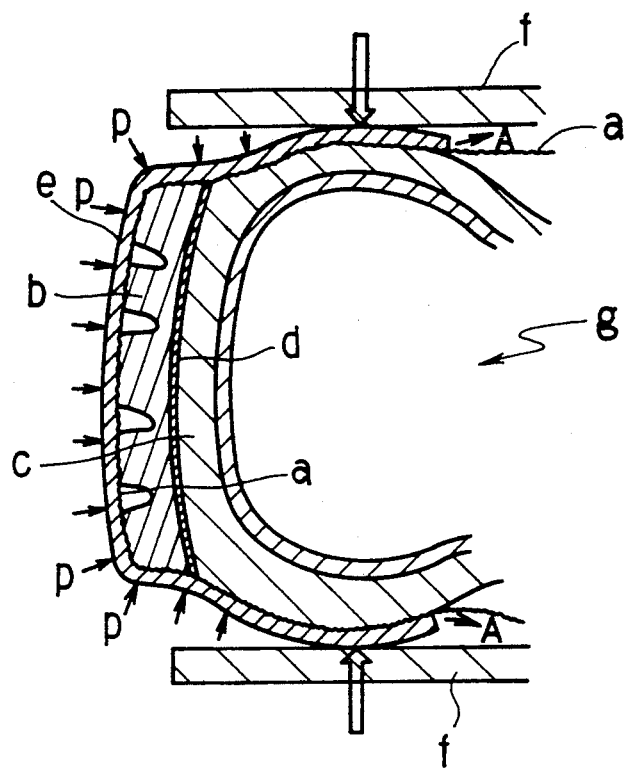
FIG. 12 is a sectional view showing an example of a conventional vulcanisation step.

Further as is clearly shown in FIG. 8, the smooth films 3 touching directly the sidewall portions of the tire 5 prevent the cloth of the belt from leaving a mark on the sidewalls in the pressurised region located under the seal plate 15. The points, "S" in FIGS. 8 and 11 show the seal portion where the seal plate 15 is in tight contact with the envelope 6. The pressure of the space 16 of the vulcanising vessel is retained by means of these seal portions. The present invention which has the above-mentioned construction obtains technical effects as follows.

Figure 13:
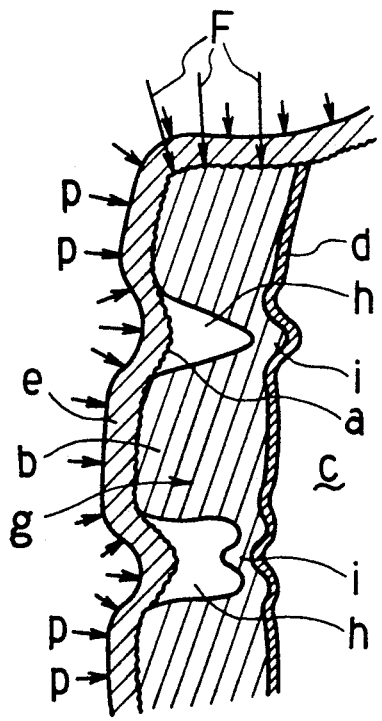
FIG. 13 is an enlarged sectional view showing the drawbacks of the conventional vulcanisation step.
Figure 14:
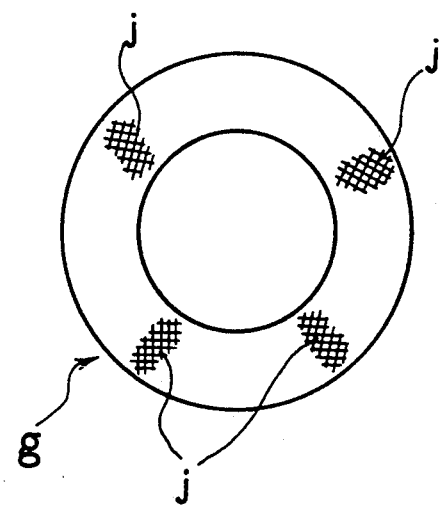
FIG. 14 is a plan view showing a conventionally retreaded tire.

1. Deformation shown in FIG. 13 does not happen in the tire grooves, and a normal shape of the tire grooves is obtained so that a tire having a superior appearance is given.
2. Because a rubber yarn is arranged in the radial direction of the tire, the air venting belt can be produced cheaply and easily.
3. When the air venting belt has the smooth film ends, it avoids marking the tire.
4. If the air venting belt is laminated with the envelope, covering and removing work is easier.

Though several embodiments of the invention are described above in detail, it is to be understood that the present invention is not limited to the above-mentioned embodiments, and various changes and modifications may be made in the invention without departing from the spirit and scope thereof.

What is claimed is:

1. An air venting belt to be laid between an outer surface of a tire and an inner surface of an envelope when a retread tire is vulcanized, comprising a base cloth made of heat resistant woven cloth which is expansible at least in a longitudinal direction of the belt and means for separating the base cloth from the outer surface of the tire and for preventing the base cloth from marking the tire, the means being located at least at one end of the base cloth but being absent from a middle portion of the base cloth.

2. The air venting belt of claim 1, wherein said expansible woven cloth comprises a rubber yarn extending in the longitudinal direction of the belt.

3. The air venting belt of claim 1, wherein the means for separating and preventing is a smooth film laminated on the base cloth.

4. The air venting belt of claim 2, wherein the means for separating and preventing is a smooth film laminated on the base cloth.

5. The air venting belt of claim 3, wherein the means for separating and preventing further comprises a smooth film laminated to both sides of the base cloth at least at one end of the base cloth.

6. The air venting belt of claim 4, wherein the means for separating and preventing further comprises a smooth film laminated to the other end of the base cloth such that both ends of the base cloth have a smooth film thereon.

7. The air venting belt of claim 6, wherein the smooth film at the other end of the base cloth is on both sides of the base cloth such that both sides of both ends of the base cloth have the smooth film thereon and wherein both sides of a middle portion of the base cloth lack the smooth film.

8. The air venting belt of claim 1, wherein the outer surface of the tire has grooves therein and wherein a portion of the cloth is stretchable to deform and fit into said grooves.

9. The air venting belt of claim 8, wherein the means for separating and preventing is located at both ends of the base cloth and wherein the portion of the cloth which deforms and fits into the grooves in the tire is free of the means for separating and preventing.

10. The air venting belt of claim 9, wherein the means for separating and preventing comprises a smooth film on at least one side of both ends of the belt.

11. The air venting belt of claim 10, wherein the smooth film is provided on both sides of both ends of the belt.

* * * * *